United States Patent
Mueller et al.

(10) Patent No.: US 6,463,739 B1
(45) Date of Patent: Oct. 15, 2002

(54) AFTERBURNER HEAT SHIELD

(75) Inventors: John Herman Mueller, Hamilton, OH (US); Mark Leonard Vossman, Mason, OH (US); William Ralph Maskiell, Batavia, OH (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 09/777,167

(22) Filed: Feb. 5, 2001

(51) Int. Cl.[7] .................................................. F02K 3/10
(52) U.S. Cl. .......................................... 60/765; 60/798
(58) Field of Search ......................... 60/761, 763, 765, 60/798

(56) References Cited

U.S. PATENT DOCUMENTS

| | | | |
|---|---|---|---|
| 2,944,388 A | * | 7/1960 | Bayer .......................... 60/35.6 |
| 4,185,458 A | | 1/1980 | Ernst |
| 4,315,401 A | | 2/1982 | Beal et al. |
| 4,901,527 A | | 2/1990 | Nash et al. |
| 4,989,407 A | | 2/1991 | Grant, Jr. |
| 5,076,062 A | | 12/1991 | Abreu |
| 5,297,391 A | * | 3/1994 | Roche |
| 5,335,490 A | | 8/1994 | Johnson et al. |
| 5,385,015 A | | 1/1995 | Clements et al. |
| 5,396,761 A | | 3/1995 | Woltmann et al. |
| 5,396,763 A | | 3/1995 | Mayer et al. |
| 5,685,140 A | * | 11/1997 | Clements ....................... 60/204 |

* cited by examiner

Primary Examiner—Ehud Gartenberg
(74) Attorney, Agent, or Firm—Rodney M. Young; Senniger, Powers, Leavitt & Roedel (57) ABSTRACT

A heat shield and support strut for a turbine engine afterburner. The heat shield can be replaced without moving or disconnecting the fuel tube. The heat shield includes a housing that may be telescoped over the fuel injection tube and is attachable to the strut without moving the housing transverse to a longitudinal axis of the fuel injection tube. The support strut includes a body having an outer end for attachment to an outer wall of the afterburner section, an inner end, and a passage extending through the body from its outer end to its inner end for receiving the fuel injection tube. The inner end has a cavity for receiving the head of the heat shield. The cavity is shaped for a close fit on the head in the cavity. The body has a flat mounting surface in the cavity for engagement by the flat mounting surface of the head.

15 Claims, 7 Drawing Sheets

AFTERBURNER HEAT SHIELD

BACKGROUND OF THE INVENTION

The present invention relates generally to afterburners for aircraft gas turbine engines, and in particular to a heat shield for protecting an afterburner fuel injection tube that is readily replaceable from inside an engine duct.

Afterburning or reheating is one method of augmenting the basic thrust of a turbine engine. An afterburner increases thrust by adding thermal energy to a stream of turbine exhaust gas and engine bypass air located aft of the core engine. The afterburner includes several fuel injection tubes, or spray bars, having multiple spray orifices for dispensing fuel into the stream of gas. The tubes frequently extend radially inwardly from an outer wall of the engine duct. The afterburner also includes flame stabilization devices, known as flameholders, for creating regions of reduced gas velocity to facilitate effective combustion.

Components of the engine duct and afterburner are frequently cooled for protection from exposure to high temperatures and to extend useful lifetime. Cooling is provided by air that bypasses the core engine, known as fan air, which flows through one or more stages of the engine's fan section, or alternatively by compressor bleed air. Cooling air is typically conveyed in an annular bypass duct formed between the cylindrical outer wall and a liner spaced radially inwardly from the outer wall. The liner is a cylindrical shell which functions as a barrier to isolate hot exhaust gas from the cooling air. The cooling air is distributed from the bypass duct to the afterburner, surface of the liner, and exhaust nozzle.

Each of the fuel injection tubes is typically protected by a heat shield. The heat shield is a housing for enclosing the tube and receiving cooling air from the bypass duct for delivery along the tube. A plurality of window openings are spaced along the heat shield for alignment with orifices of the tube to permit fuel to be sprayed from the tube into the gas stream. Flameholders may be mounted on the heat shield or, alternatively, mounted in the duct separate from the fuel injection tubes.

Heat shields are periodically replaced due to damage, thermal cyclic fatigue, or accumulation of coking residue. Ideally a heat shield should be replaceable in a short time so that aircraft down-time is minimized. Unfortunately, it requires many hours to replace some types of heat shields because they are not removable from a position within the engine duct. Either the heat shield is not installable over the fuel tube from inside the duct, or an attachment between the heat shield and its supporting structure is not accessible from inside the duct. Accordingly, in order to replace these heat shields, maintenance personnel must first remove the engine from the aircraft. That necessitates disconnecting all electrical cables, fuel lines, and hydraulic lines between the engine and airframe, and re-connecting them upon completion of the maintenance action. These steps are time consuming and expensive.

Another type of heat shield, shown in U.S. Pat. No. 5,335,490, is installable and removable from inside the engine duct but still requires disconnecting the fuel injection tubes. That type of heat shield has a support attachment with an axially extending nose connector. During installation or removal, the heat shield must be moved transverse to the axis of the fuel tube in order to engage/disengage the connector. Such transverse motion is impossible while the fuel tube is installed due to interference with internal structure that is part of every heat shield. Accordingly, the fuel tube must be removed and subsequently reinstalled, requiring a time-consuming fuel system leak test.

When a heat shield is mounted in position in the engine duct, it must be firmly attached with a sturdy, reliable connection between the heat shield and its support. Unfortunately, some types of heat shields have a drawback in that the connection is at a single point, with only one fastener. As a result, the heat shield is subject to slippage when exposed to acoustical vibrations in the engine or to high loads, particularly due to forces transverse to the shield when the heat shield is at a 3 or 9 o'clock position in the engine duct and the aircraft experiences a hard landing.

SUMMARY OF THE INVENTION

In general, a heat shield of the present invention is for protecting a fuel injection tube of a turbine engine afterburner section. The afterburner section is of the type having a cylindrical outer wall and a liner positioned in spaced relation from the outer wall and generally defining a boundary between a core duct for flow of turbine exhaust gas and an annular bypass duct for flow of cooling air. At least one fuel injection tube extends from the outer wall inwardly to the core duct. The tube has a longitudinal axis and is mounted so that a first portion of the tube is located in the bypass duct and a second portion of the tube is located in the core duct. A strut is positioned generally between the outer wall and the liner and enclosing the first portion of the fuel injection tube. The heat shield comprises a housing having an elongate internal channel therein open at one end for allowing the housing to be telescoped over the tube to a mounting position in which the second portion of the tube extends longitudinally in the channel. A mounting system on the housing adjacent the open end of the channel attaches the housing to the strut when the housing is in the mounting position without moving the housing transverse to the longitudinal axis of the fuel tube so that the housing can be installed in the afterburner section without moving or disconnecting the fuel tube.

In another aspect, a support strut of the present invention supports a heat shield in a turbine engine afterburner section. The afterburner section is of the type having a cylindrical outer wall, a liner positioned in spaced relation from the outer wall and generally defining a boundary between a core duct for flow of turbine exhaust gas and an annular bypass duct for flow of cooling air. At least one fuel injection tube extends from the outer wall inwardly to the core duct. The tube is mounted so that a first portion is located in the bypass duct and a second portion is located in the core duct. The heat shield has a housing for enclosing the second portion of the tube and has a head with a generally flat mounting surface. The support strut comprises a body mountable in the bypass duct of the afterburner section. The body has an outer end for attachment to the outer wall, an inner end, and a passage extending through the body from its outer end to its inner end for receiving the fuel tube. The inner end has a cavity therein for receiving the head of the heat shield, the cavity being sized and shaped for a close fit of the head in the cavity. The body has a generally flat mounting surface in the cavity for engagement by the flat mounting surface of the head whereby the head may be placed in the cavity to mount the heat shield on the strut with the mounting surfaces in face to face engagement to comprise a solid connection between the head and the body.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
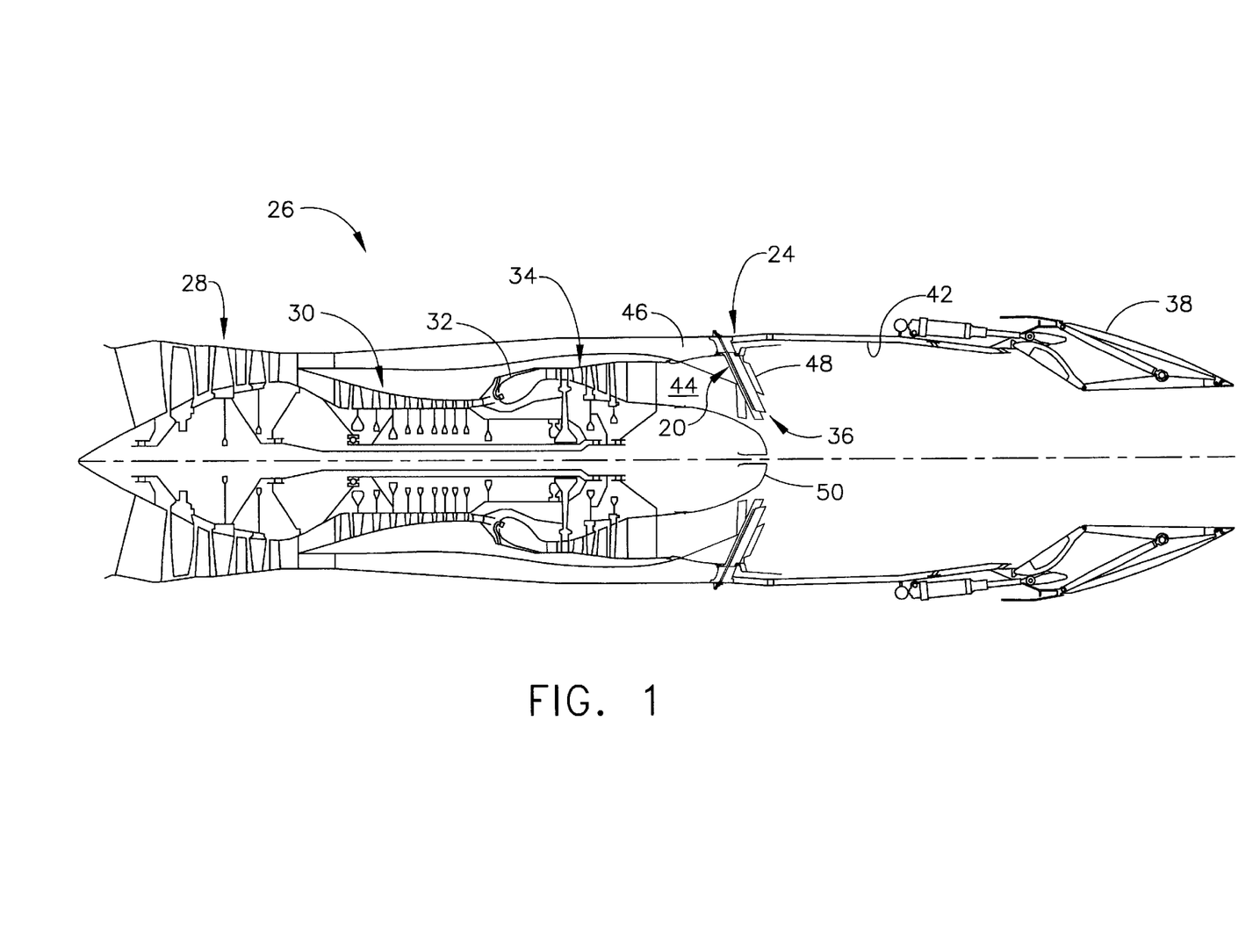
FIG. 1 is a schematic side elevational section of an aircraft gas turbine engine with a radial-type afterburner.
Figure 2:
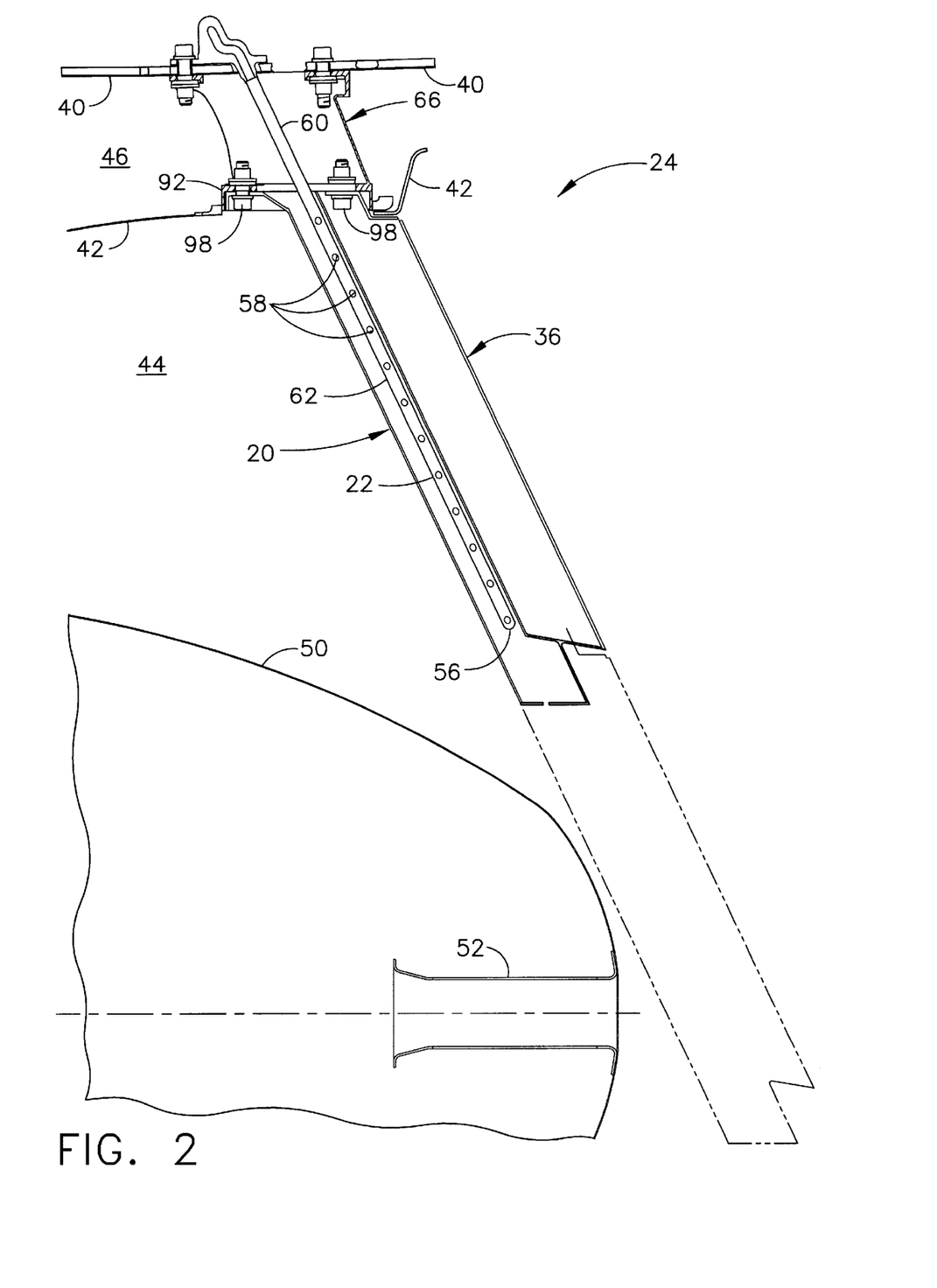
FIG. 2 is an enlarged schematic side elevational section of an afterburner section of the engine having a heat shield according to the present invention.

Referring now to the drawings and in particular to FIGS. 1 and 2, a heat shield of the present invention is indicated generally at 20. The heat shield 20 protects a fuel injection tube 22 installed in an afterburner section 24 of a conventional aircraft gas turbine engine 26. The engine 26 is cylindrically-shaped and includes, sequentially, a fan section 28, compressor 30, combustion chambers 32, turbine 34, afterburner 36, and exhaust nozzle 38. The afterburner 36, or augmentor, is provided for increasing the thrust of the engine 26 as needed for enhanced aircraft acceleration, maneuverability, or speed.

The afterburner section 24 of the engine is of the type having a generally cylindrical outer wall 40 and a liner 42 mounted in spaced relation from the outer wall. The liner 42 generally defines a boundary between a central, core duct 44 for flow of turbine exhaust gas and an outer, annular bypass duct 46 for flow of cooling air. The bypass duct 46 extends from the fan section 28 aft to the exhaust nozzle 38 for protecting the outer wall 40 and conveying cooling air to the nozzle. At all engine power settings, the temperature of the turbine exhaust gas is substantially higher than that of the cooling air. The outer wall 40 and the liner 42 typically are not designed to withstand exposure to the high temperatures, and accordingly are cooled by the cooling air. A source of cooling air is preferably the engine's fan section 28. However, it is understood that the cooling air could originate at a compressor bleed port, ram intake duct, or refrigerant cycle system without departing from the scope of the invention.

The afterburner section 24 also includes a mixer 48, or mixing duct, having a plurality of passages circumferentially spaced for delivering a portion of the cooling air into the core duct 44. An engine centerbody termination 50 is included in the center of the duct. The centerbody termination 50 is a generally conical shell with a vent tube 52.

Referring to FIG. 2, at least one fuel injection tube 22 for delivering fuel extends from the outer wall 40 inwardly along a straight longitudinal axis to a cantilevered end 56 inside the core duct 44. Typically there are a plurality of fuel injection tubes 22 spaced at equal angular intervals about the circumference of the afterburner section 24. For example, an F110 gas turbine engine with a radial-type augmentor has thirty-two fuel injection tubes in spaced relationship about its circumference. Each of the tubes 22 originates at a fuel manifold and distributor (not shown) located outside the outer wall 40. The tube 22 is a continuous, single-wall pipe with a plurality of spray orifices 58 disposed along the tube for dispensing fuel at several radial locations. The tube 22 passes through the bypass duct 46 and into the core duct so that a first portion 60 of the tube is generally located in the bypass duct and a second portion 62 is located generally in the core duct.

A support strut 66 is positioned generally between the outer wall 40 and the liner 42 of the afterburner section, and it encloses the first portion 60 of the fuel injection tube 22. The heat shield 20 is supported in the core duct 44 in cantilever mounted arrangement on the strut 66. As shown in FIGS. 3–6, the strut 66 includes a body 68 having at least one internal passage 70 for enclosing the tube 22. The strut 66 is aerodynamically shaped with a smooth external surface and is generally thin in the direction of flow of the bypass duct 46 to inhibit loss of pressure in the cooling air as it flows in the bypass duct past the strut. The body 66 has an outer end 72 for attachment to the outer wall 40 and an inner end 74. The passage 70 extends through the body 68 from the outer end 72 to the inner end 74. An opening (not shown) is positioned along a leading edge 76 of the body as an air intake for receiving cooling air from the bypass duct 46 into the passage 70 and delivering it adjacent the tube 22 and into the heat shield 20 for cooling the heat shield.

Figure 3:
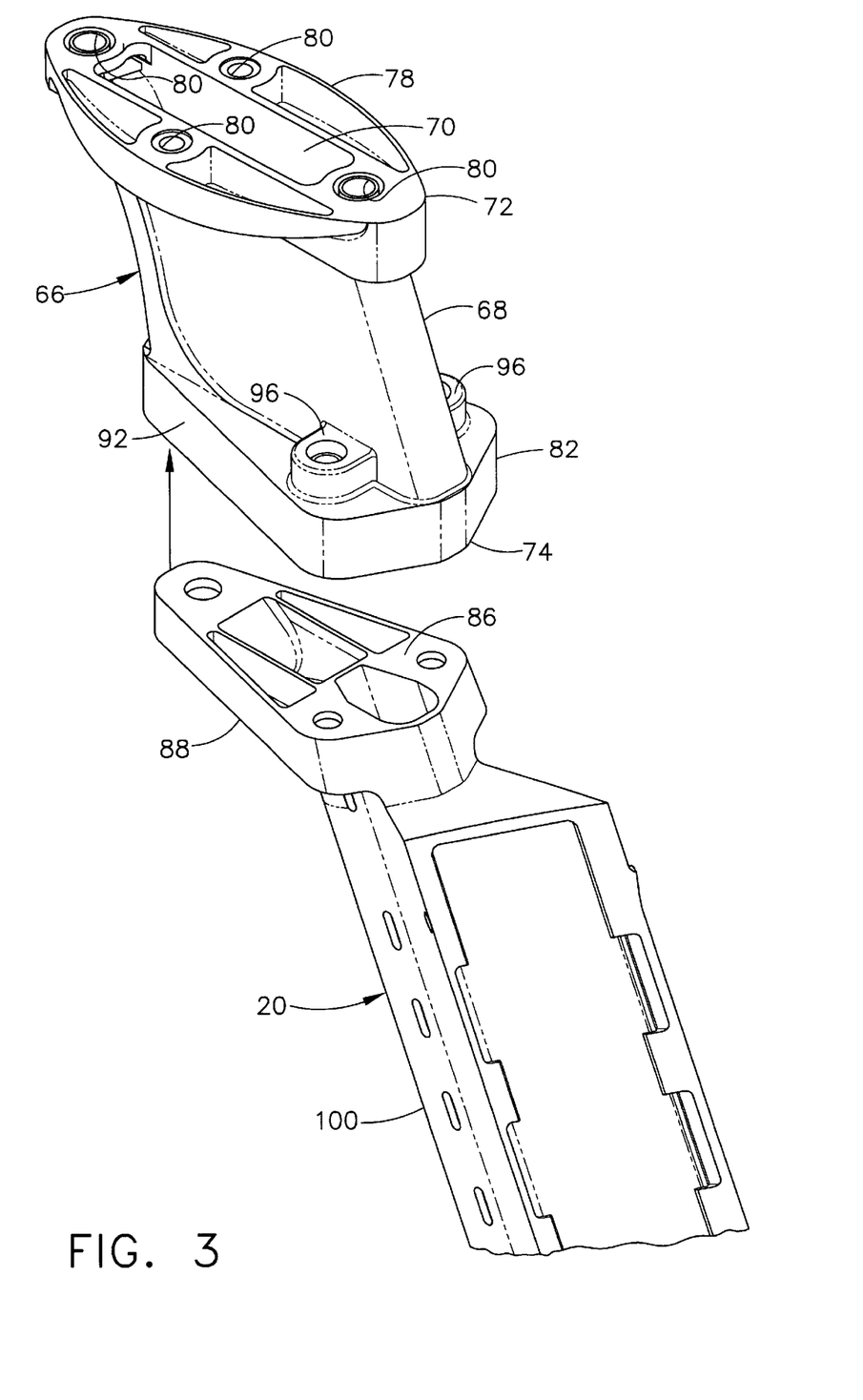
FIG. 3 is an exploded perspective view of a support strut and heat shield mountable on the strut.
Figure 5:
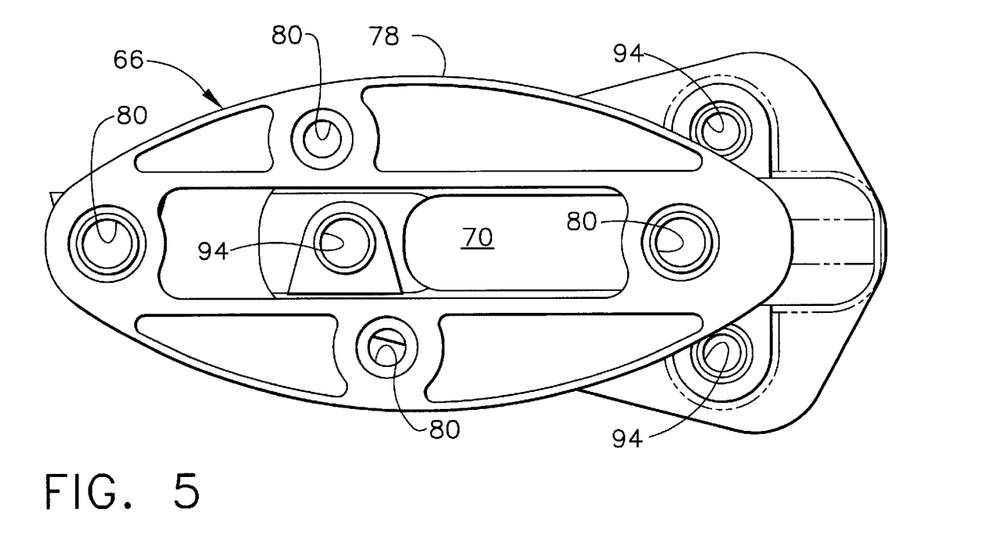
FIG. 5 is a top plan of the strut showing an outer end of the strut.

An outer fastening flange 78 is integrally formed on the outer end 72 of the body for attaching the strut 66 to the outer wall 40 of the afterburner section. As shown in FIGS. 3 and 5, the outer flange 78 is generally elliptical in shape with four fastener holes 80 to mount the strut to the outer wall. It is understood that other shapes or number of fastener holes do not depart from the scope of the present invention.

An inner fastening flange 82 (FIG. 6) is positioned on the inner end 74 of the body for receivably mounting the heat shield 20 on the strut 66. Significantly, the inner flange 82 is configured to receive and mount the heat shield 20 when the heat shield is moved into a mounting position by moving the heat shield along the longitudinal axis of the fuel tube 22. The inner end 74 of the body includes a generally flat, recessed mounting surface 84 which is engagable by a corresponding mounting surface 86 on a head 88 (FIG. 7) of the heat shield. The inner fastening flange 82 of the strut 66 and the head 88 of the heat shield 20 together comprise a mounting system for connecting the heat shield to the strut.

The inner end 74 of the strut body has a cavity 90 for receiving the head 88 of the heat shield 20. The cavity is sized and shaped for a close fit of the head in the cavity with the mounting surfaces 84, 86 in face to face engagement. The cavity 90 is bounded by a rim 92 surrounding the mounting surface 84. The strut 66 is sized such that when mounted, the inner fastening flange 82 is located at a radial position approximate the liner 42 and the liner is generally adjacent to the rim 92 (FIG. 2). The heat shield 20 is mountable on the strut 66 at the inner fastening flange 82 with the mounting surface 86 of the heat shield engaging the corresponding mounting surface 84 of the strut. The two mounting surfaces 84, 86 have a common shape and size, and the close fit of the head 88 in the cavity 90 forms a rigid, solid connection.

Figure 6:
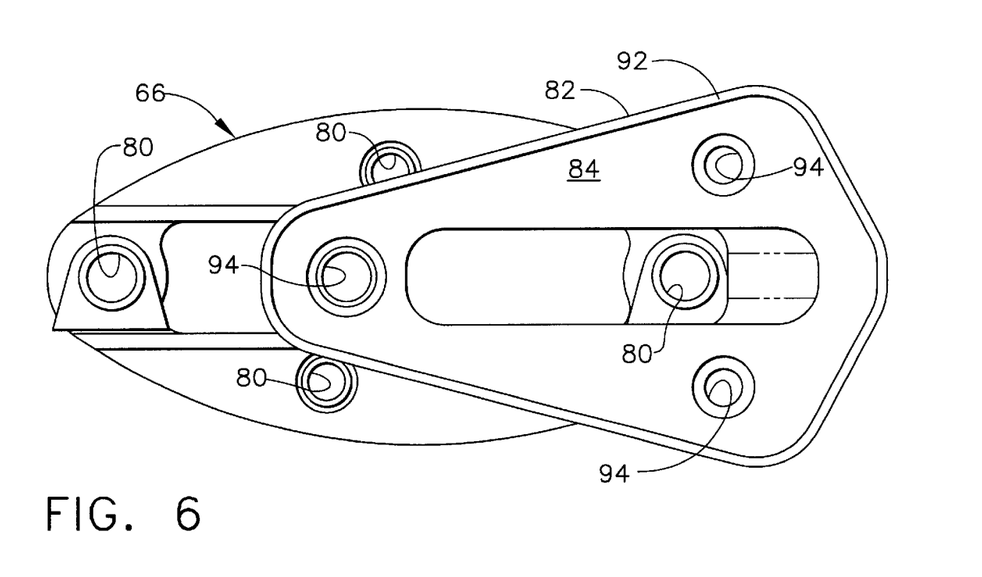
FIG. 6 is a bottom plan of the strut showing an inner end of the strut.

Preferably, the mounting surface 84 of the strut body has three fastener holes 94 arranged in a triangular pattern, as shown in FIG. 6, for receiving three fasteners, such as bolts 98 (FIG. 2), to attach the heat shield 20 to the strut 66. The use of three fasteners so arranged forms a sturdy and reliable attachment for withstanding forces, torques, and vibrations to which the heat shield is exposed without significant deflection or slippage relative to the strut. As shown in FIGS.

Figure 4:
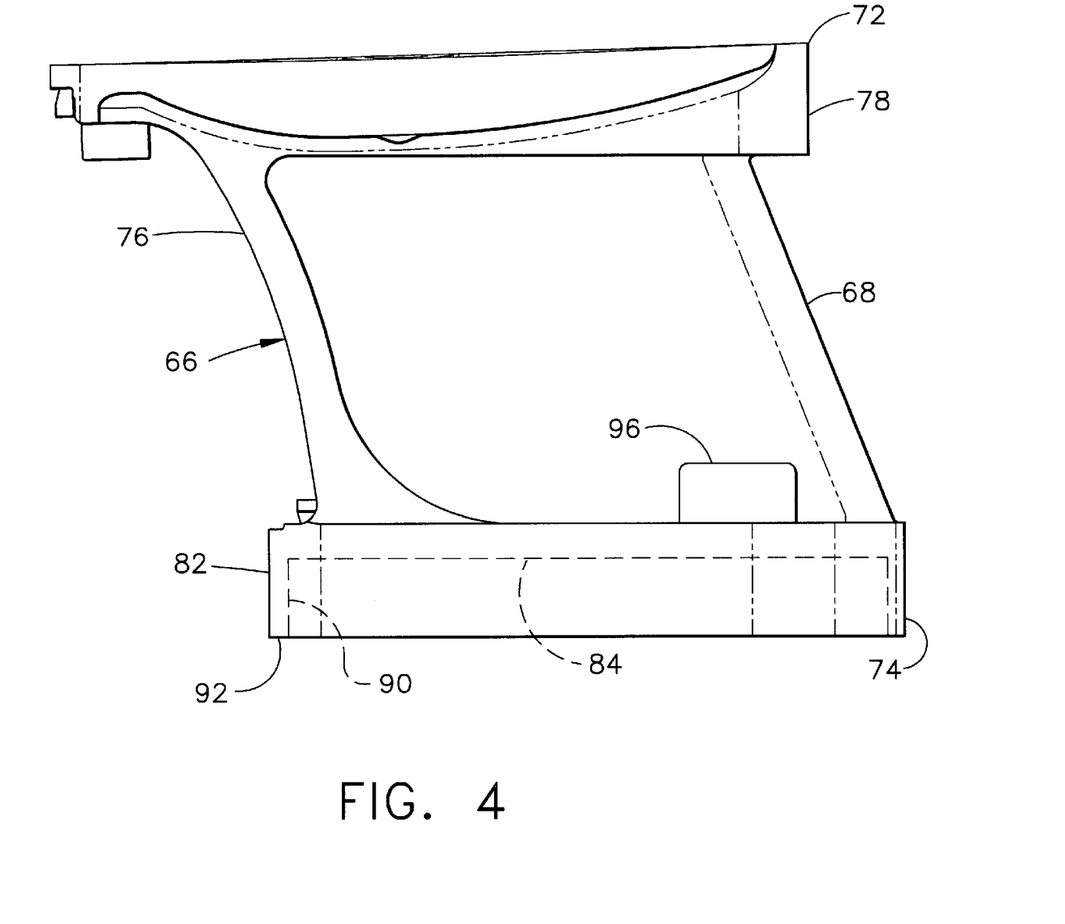
FIG. 4 is a side elevation of the support strut.

3 and 4, a boss 96 on the inner fastening flange 82 defines portions of the two aft-most fastener holes 94 to increase a depth of each fastener hole. The holes 94 and bosses 96 are internally threaded. The mounting system is configured so that bolts 98 are radially oriented in the engine duct for ease of installation and removal. It is understood that the inner fastening flange 82 could be formed to receive one, two, or any number of fasteners without departing from the scope of this invention.

Figure 7:
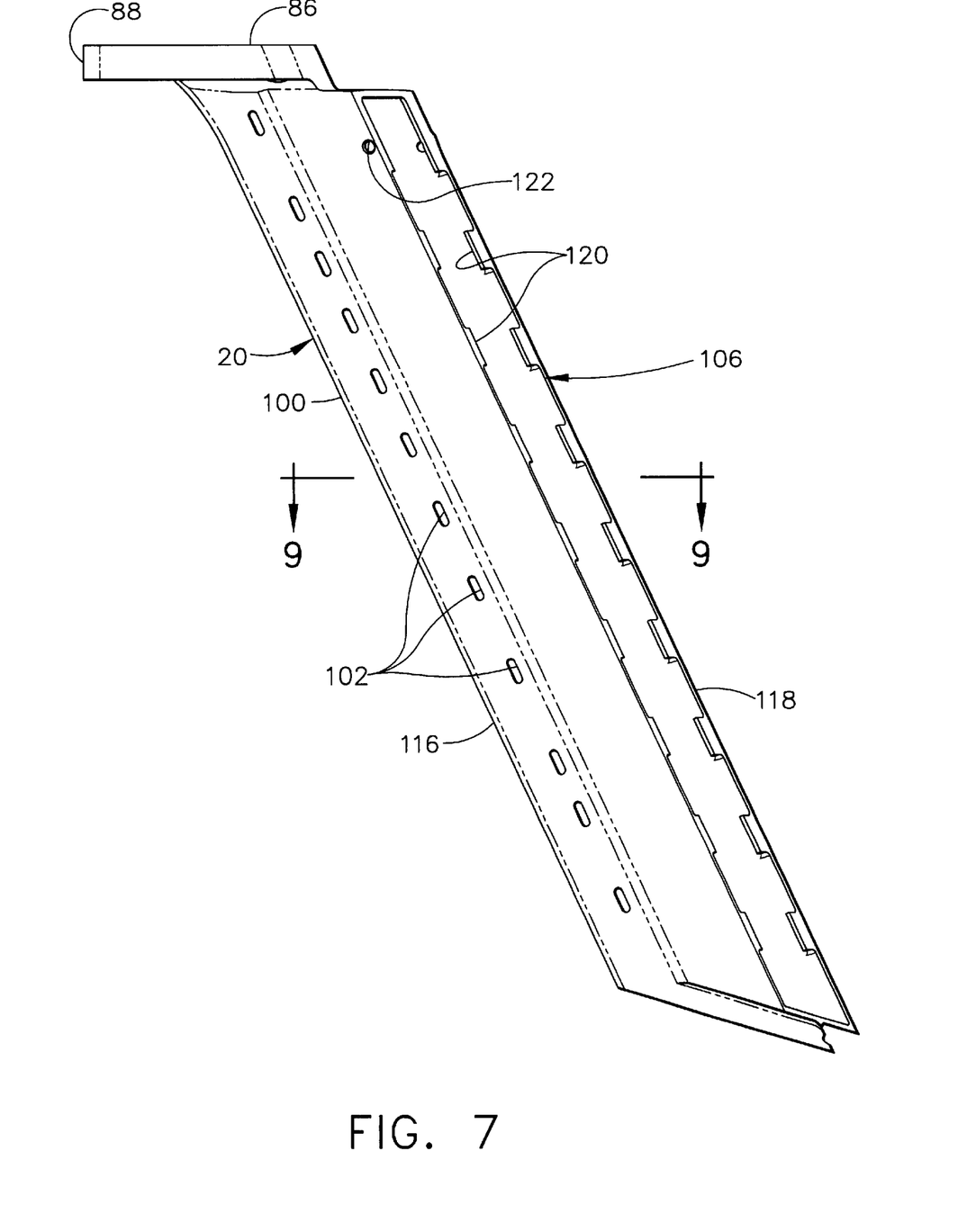
FIG. 7 is a side elevation of the heat shield.
Figure 8:
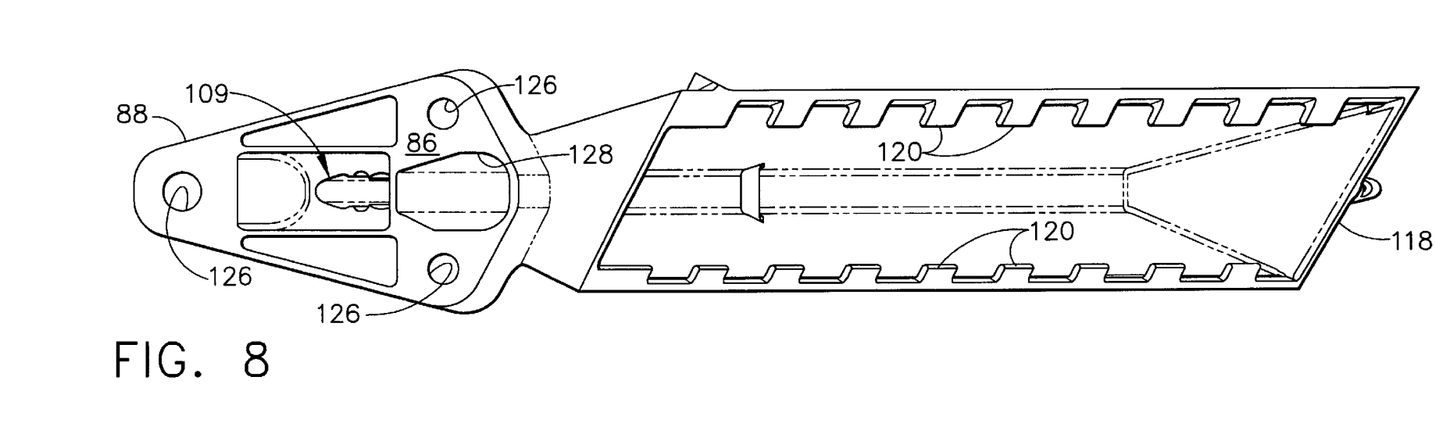
FIG. 8 is a top plan of the heat shield showing an head for mounting to the strut.
Figure 9:
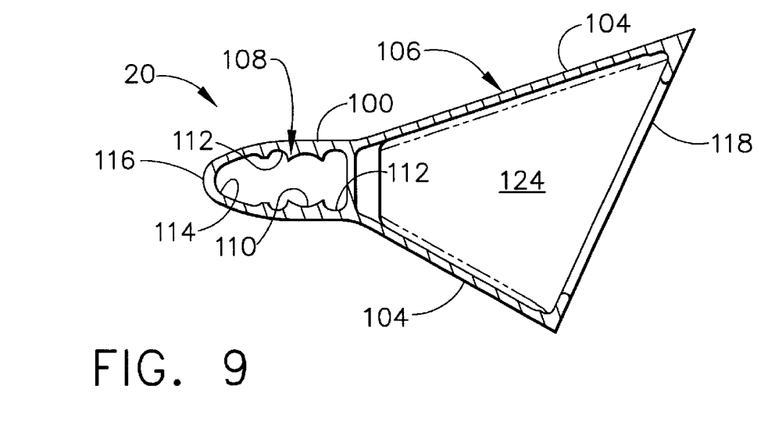
FIG. 9 is a section taken on line 9—9 of FIG. 7.

Referring to FIGS. 7–9, the heat shield 20 includes a housing 100 that is receivable over the second portion 62 of the fuel injection tube 22 and along the longitudinal axis of the tube. A plurality of window openings 102 are spaced along the heat shield 20 for alignment with spray orifices 58 of the tube to permit fuel to be sprayed from the tube into the gas stream. The housing 100 of the preferred embodiment shown in the drawings is formed integrally with sidewalls 104 of a flameholder, the flameholder being generally designated at 106. However, it is understood that the heat shield 20 may be completely separate from any flameholder or may be non-integrally attached to a flameholder without departing from the scope of this invention.

The housing 100 is formed to have at least one elongate internal channel 108 for enclosing the tube 22. An opening 109 in at least one end of the housing allows the channel 108 and housing to be telescoped over the fuel tube 22. The opening 109 of the preferred embodiment is located at the mounting surface 86. As shown in section in FIG. 9, the channel 108 has a generally round, central portion 110 and wider portions 112 on two sides adjacent the central portion. The central portion 110 is sized for receiving the fuel tube 22, which is correspondingly round in section. The wider portions 112 of the channel 108 permit flow of cooling air along a longitudinal extent of the housing 100, and adjacent the tube 22, to remove heat from the tube. A forward portion 114 of the internal channel 108 is positioned for cooling a leading edge 116 of the housing. It is understood that the housing 100 may have any number of internal channels, arranged with any shape and may be either separate from or joined with the channel 108 that encloses the tube 22.

The sidewalls 104 of the flameholder 106 extend from the housing 100 and are configured to create a flared, aerodynamic blockage to a stream of exhaust gas flowing in the core duct 44. The blockage facilates a region of reduced gas velocity behind the flameholder 106 sufficient for a stable flame and efficient combustion. A back panel (not shown) fits between the sidewalls along a trailing edge 118 of the flameholder 106. The back panel is held in place by a plurality of tabs 120 spaced along each sidewall 104 and a securing pin (not shown) inserted through a pinhole 122 (FIG. 7). Between the sidewalls 104, a flameholder cooling passage 124 is formed for flow of cooling air along the flameholder 106 for cooling thereof.

The head 88 (FIG. 8) on the housing 100 is engageable with the strut 66 and functions as a mount for attaching the housing to the strut. The head 88 is receivable in the cavity 90 of the strut body 68 at the inner end 74. A flat end face on the head 88, comprising the mounting surface 86, includes three fastener holes 126 therethrough for attachment to the strut. The holes 126 correspond to the fastener holes 94 in the mounting surface 84 of the strut, being arranged in a triangular formation in the preferred embodiment. The opening 109 on the head 88 receives cooling air from the strut to deliver it along the fuel tube 22. The flameholder cooling passage 124 communicates with a second opening 128 in the head 88 for receiving cooling air from the strut to deliver it to the flameholder. When the housing 100 is in a mounting position, the openings 109 and 128 on the head 88 are in alignment with the opening 77 on the inner end 74 of the strut body.

The heat shield 20 and strut 66 are preferably formed of a suitable high temperature material such as a castable cobalt alloy, such as Mar-M-509, or a nickel based alloy such as INCONEL (a registered trademark of Inco Alloys International, Inc. of Huntington, W.Va.).

In operation, the heat shield 20 is installable in the afterburner section 24 of the engine 26 by first positioning the housing 100 inside the core duct 44 in alignment with the fuel tube 22 along its longitudinal axis, at a detached position (shown in phantom on FIG. 2). The centerbody termination 50 of the engine does not interfere with the positioning of the housing 100 in aligned position. The housing 100 is telescoped over the end 56 of the tube 22 along its longitudinal axis to a mounting position where the head of the shield is aligned in the cavity 90 of the strut with the mounting surface 86 engaging the mounting surface 84. As the housing 100 is being installed and is telescoped over the tube 22, the head 88 is readily positioned for reaching the mounting position and being aligned and received into the cavity 90 of the strut 66. Three fastener holes 126 on the head are positioned for accessibility from inside the engine duct, and therefore fasteners 98 may be inserted or removed from a position inside the engine duct to attach or detach the heat shield 20 and the strut 66. Further, the heat shield 20 is attachable to the strut 66 without moving the heat shield transverse to the longitudinal axis of the fuel tube 22. Accordingly, the heat shield can be installed and removed without moving or disconnecting the fuel tube. Thus repairs may be conducted rapidly. The connection between the heat shield 20 and strut 66 provides for stiffness and lateral stability.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A heat shield for protecting a fuel injection tube of a turbine engine afterburner section, the afterburner section having a cylindrical outer wall, a liner positioned in spaced relation from the outer wall and generally defining a boundary between a core duct for flow of turbine exhaust gas and an annular bypass duct for flow of cooling air, at least one fuel injection tube extending from the outer wall inwardly to the core duct, the fuel injection tube having a longitudinal axis, a first portion of the fuel injection tube in the bypass duct and a second portion of the fuel injection tube in the core duct, and a strut positioned generally between the outer wall and the liner and enclosing the first portion of the fuel injection tube, the heat shield comprising:

a housing having an elongate internal channel therein open at one end for allowing the housing to be telescoped over said fuel injection tube to a mounting position in which the second portion of the fuel injection tube extends longitudinally in said channel; and a mounting system on the housing adjacent the open end of the channel for attaching the housing to the strut when the housing is in said mounting position without moving the housing transverse to the longitudinal axis of the fuel injection tube so that the housing can be installed in said afterburner section without moving or disconnecting the fuel injection tube.

2. A heat shield as set forth in claim 1 wherein the mounting system comprises a mount and one or more fasteners for attaching the mount to the strut, said one or more fasteners being accessible from a position within said core duct.

3. A heat shield as set forth in claim 1 wherein said mounting system comprises a head on the housing that engages the strut when the housing is moved to the mounting position.

4. A heat shield as set forth in claim 3 wherein the head has a flat end face engageable with the strut.

5. A heat shield as set forth in claim 4 wherein said mounting system further comprises at least two fasteners receivable through corresponding fastener holes in said head for attaching the housing to the strut.

6. A heat shield as set forth in claim 5 wherein said fastener holes extend through the end face of the head.

7. A heat shield as set forth in claim 6 wherein the head includes three fastener holes positioned in generally triangular arrangement.

8. A heat shield as set forth in claim 1 wherein said housing is sized and shaped so that it may be installed in the afterburner section by positioning the housing inside the core duct with the internal channel in alignment with the longitudinal axis of the fuel injection tube and telescoping the heat shield over the fuel injection tube to the mounting position.

9. A heat shield as set forth in claim 8 wherein said housing includes an internal passage for flow of cooling air to remove heat from the fuel injection tube.

10. A support strut for supporting a heat shield in a turbine engine afterburner section, the afterburner section having a cylindrical outer wall, a liner positioned in spaced relation from the outer wall and generally defining a boundary between a core duct for flow of turbine exhaust gas and an annular bypass duct for flow of cooling air, at least one fuel injection tube extending from the outer wall inwardly to the core duct, the fuel injection tube having a first portion in the bypass duct and a second portion in the core duct, the heat shield having a housing for enclosing said second portion of the fuel injection tube and having a head with a generally flat mounting surface, the support strut comprising:

a body mountable in said bypass duct of the afterburner section, said body having an outer end for attachment to the outer wall, an inner end, and a passage extending through the body from its outer end to its inner end for receiving said fuel injection tube;

said inner end having a cavity therein for receiving the head of said heat shield, said cavity being sized and shaped for a close fit of the head in the cavity;

said body having a generally flat mounting surface in said cavity for engagement with said flat mounting surface of the head whereby said head may be placed in said cavity to mount the heat shield on the strut with said mounting surfaces in face to face engagement to comprise a solid connection between said head and said body.

11. A support strut as set forth in claim 10 further comprising an outer fastening flange at the outer end of the body for fastening the body to the outer wall and an inner fastening flange at the inner end of the body.

12. A support strut as set forth in claim 10 further comprising at least one hole in the mounting surface of the body for receiving a fastener to attach the head of the heat shield to the body.

13. A support strut as set forth in claim 12 wherein the mounting surface of the body has three holes in generally triangular pattern for receiving three fasteners.

14. A support strut as set forth in claim 10 wherein said cavity is bounded by a rim surrounding the mounting surface of the body, the mounting surface being recessed relative to the rim.

15. A support strut as set forth in claim 14 wherein said mounting surface of the body has a shape that corresponds to a shape of said mounting surface on the head of the heat shield.

* * * * *